(12) United States Patent
Bredeweg

(10) Patent No.: US 11,632,899 B2
(45) Date of Patent: Apr. 25, 2023

(54) APPARATUS AND METHODS: PLANTER METER FOR ORIENTING SEED AND IN SOIL SEED PLACEMENT

(71) Applicant: Luke Tyler Bredeweg, Byron Center, MI (US)

(72) Inventor: Luke Tyler Bredeweg, Byron Center, MI (US)

( * ) Notice: Subject to any disclaimer, the term of this patent is extended or adjusted under 35 U.S.C. 154(b) by 329 days.

(21) Appl. No.: 16/693,353

(22) Filed: Nov. 24, 2019

(65) Prior Publication Data

US 2020/0187410 A1 Jun. 18, 2020

Related U.S. Application Data

(60) Provisional application No. 62/917,155, filed on Nov. 26, 2018.

(51) Int. Cl.
*A01C 7/20* (2006.01)
*A01C 7/04* (2006.01)

(52) U.S. Cl.
CPC ............... *A01C 7/20* (2013.01); *A01C 7/044* (2013.01)

(58) Field of Classification Search
CPC .. A01C 7/04; A01C 7/046; A01C 7/20; A01C 7/206
See application file for complete search history.

(56) References Cited

U.S. PATENT DOCUMENTS

| | | | | |
|---|---|---|---|---|
| 3,329,310 A | * | 7/1967 | Ramsay | A01C 7/18 222/218 |
| 5,848,571 A | * | 12/1998 | Stufflebeam | A01C 7/046 221/211 |
| 2005/0172874 A1 | * | 8/2005 | Bellefroid | A01C 7/102 111/177 |
| 2014/0182494 A1 | * | 7/2014 | Friestad | A01C 7/20 111/171 |
| 2015/0334913 A1 | * | 11/2015 | Gentili | A01C 7/046 111/171 |
| 2019/0090415 A1 | * | 3/2019 | Schoeny | A01C 7/205 |
| 2019/0223372 A1 | * | 7/2019 | Koch | A01C 7/16 |
| 2019/0230846 A1 | * | 8/2019 | Koch | A01C 21/005 |
| 2020/0000017 A1 | * | 1/2020 | Marler, III | A01C 7/20 |
| 2021/0127564 A1 | * | 5/2021 | Fernández | A01C 7/081 |

FOREIGN PATENT DOCUMENTS

| | | | | |
|---|---|---|---|---|
| EP | 2225928 A2 | * | 9/2010 | A01C 7/046 |
| EP | 3017673 A1 | * | 5/2016 | A01C 7/046 |
| FR | 2813159 A1 | * | 3/2002 | A01C 7/044 |
| WO | WO-9426090 A2 | * | 11/1994 | A01C 7/002 |
| WO | WO-2019091871 A1 | * | 5/2019 | A01C 7/04 |
| WO | WO-2019220346 A1 | * | 11/2019 | A01C 5/066 |

* cited by examiner

*Primary Examiner* — Thomas B Will
*Assistant Examiner* — Ian A Normile

(57) ABSTRACT

A seed planter meter that orients plant seed and a delivery mechanism which can transport the seed to the soil while maintaining the seed's orientation during transport to the soil and encapsulation in the soil.

14 Claims, 8 Drawing Sheets

APPARATUS AND METHODS: PLANTER METER FOR ORIENTING SEED AND IN SOIL SEED PLACEMENT

This invention claims benefit to prior-filed provisional patent application No. 62/917,155.

BACKGROUND OF THE INVENTION

This invention relates to the precision singulation and placement of plant seeds into the soil during planting using mechanical planting equipment. Studies have shown that precision planting relating to plant spacing and seed orientation affect the crop's ability to achieve higher yields. Consistent in-row seed spacing is important for maintaining proper seed planting densities. If seeds are planted too close together the yield suffers due to plant competition. If seeds are planted too far apart yield suffers due to inefficient use of the land area. Non-uniform seed germination results in plant competition as some plant's maturity is delayed and grow at a slower rate than neighboring taller plants; therefore, uniform seed germination is desired. It has also been proven through studies that seed orientation plays an important role in the seeds ability to quickly and consistently germinate from the soil. Current planter products offer some improvements to issues in relation to seed spacing; however, the seeds are released prior to the soil encapsulation point. This results in a sub-accurate seed spacing as there is a loss of control of the seed. Full control of the seed at the soil encapsulation point is desired to ensure high precision placement and burial of the seed. Most importantly, current planter meters do not address seed orientation, which results in the seed being planted at random orientations which discourage quick and consistent germination.

In no-till operations, it is essential to disturb the soil as little as possible. Current planters use disk openers to create a seed trench which disturb the residue on the surface of the soil. To cause less disturbance, the seed may be directly placed into the soil without cutting a seed trench.

BRIEF SUMMARY OF THE INVENTION

To address the issues of the prior art, it is important that the seed(s) get oriented in the seed meter to a desired orientation. To accomplish this, seeds are first singulated from a seed hopper and held to a seed singulation mechanism. As the seed singulation mechanism progresses, seeds populate the mechanism successively. Due to the inconsistent seed size and random seed orientation, multiple seeds may be held to a single pick location. Prior art solves this by eliminating multiple seeds using a stripper plate, known to those skilled in the art, as a "doubles eliminator". Seeds that stand upright in the seed holes on the seed singulation mechanism may need to be laid flat so they can later be observed by a sensor. In addition to eliminating multiple seeds and flattening them against the seed singulation mechanism, it may be necessary to pre-align the seed prior to sensing their orientation. The next step in the process is to determine the seed's orientation using a sensor. After knowing the seed's orientation, a controller can use the data to determine the amount of rotation needed to orient the seed to a preferred orientation. A rotator mechanism(s), which can be mounted affixed or external to the seed singulation mechanism are used to orient the seed in the proper direction prior to being handed off to a transfer mechanism which transfers the seeds to the soil. It is worth noting that some seeds may be geometrically suitable for complete mechanical orienting using the said pre-alignment mechanism; therefore, eliminating the need for further orienting prior to being handed off to a transfer mechanism. The transport mechanism has capabilities to maintain the seeds orientation during transport to the soil and burial of the seed. Wheel(s) or blade(s) are responsible for ensuring that the seed orientation and spacing is maintained by packing soil around the seed as it exits the transport mechanism. Direct seed planting from the meter is also an option to eliminate the need for preparing a seed trench.

DETAILED DESCRIPTION

Figure 1:
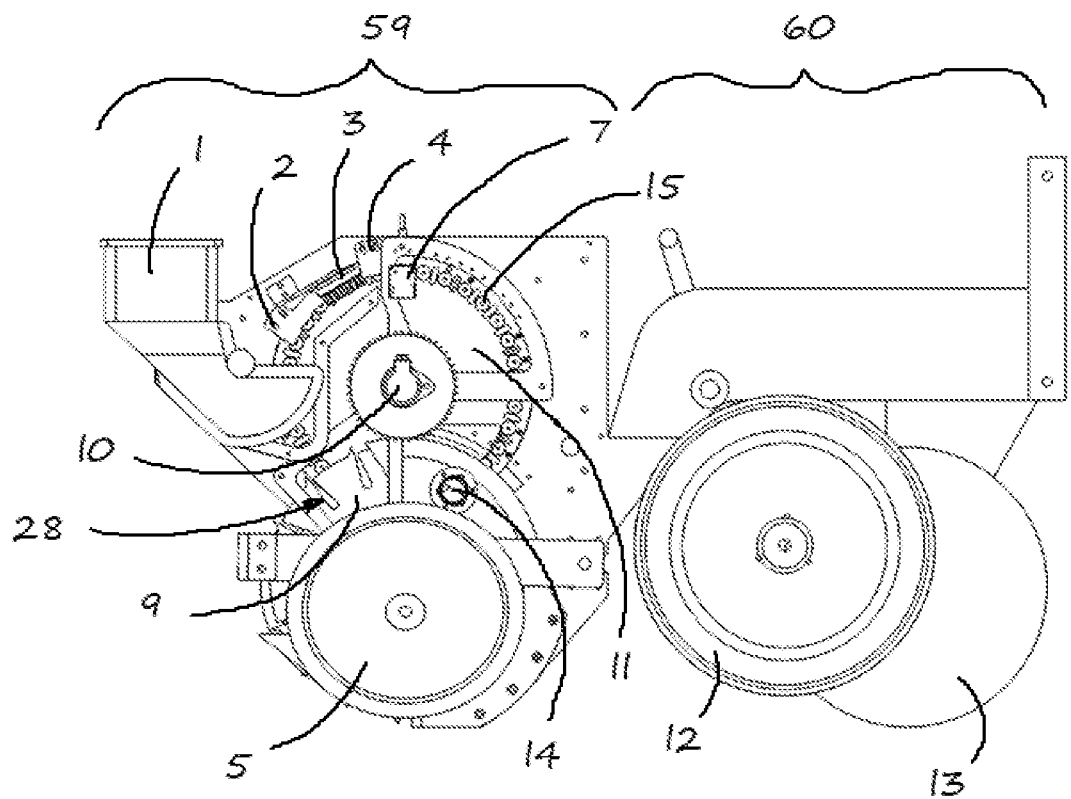
FIG. 1 is a side view of the overall assembly of a planter unit.

Referring initially to FIG. 1 there is shown an overall assembly of a planter unit. Seed meter 59 may be affixed to a seed trench opening disk assembly 60. This may be comprised of opening disk(s) 13 and gage wheel(s) 12. This assembly would be responsible for preparing a seed trench by cutting and opening the soil to the proper width and depth.

Figure 2:
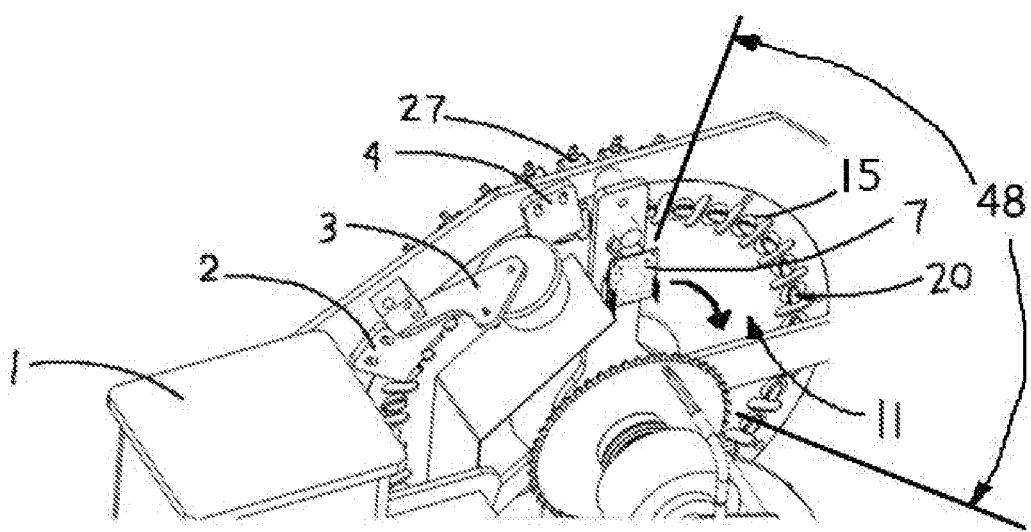
FIG. 2 is an isometric view of the singulation and inspection components of the embodiment.

In FIG. 2 bulk seeds are held in the apparatus in hopper 1 from which seed 20 is picked and held to a seed singulation repeating sequential continuous mechanism assembly using vacuum. It is worth noting that seed singulation repeating sequential continuous mechanism assembly may be in the form of a belt, disk, or alike mechanism assembly with vacuum hole feature(s) to grasp and hold the seed. For the sake of this description the seed singulation repeating sequential continuous mechanism assembly will be referred to as seed disk assembly 11. As seed disk assembly 11 rotates, in this example clockwise, seed 20 first passes an object, known to those in the art as a doubles seed eliminator 2, to ensure there is only one seed per vacuum location 15.

Next, seed disk assembly 11 progresses seed 20 to flattening wheel assembly 3. Similar mechanisms such as a belt may be used instead of flattening wheel assembly 3 for the same purpose. This lays down any seeds that may be standing up vertically. Flattening wheel assembly 3 may be driven by a surrounding mechanism such as seed plate 11 or independently using a motor to ensure a near zero relative motion between the flattener wheel surface and the passing seed motion to prevent seeds from getting knocked off seed disk assembly 11. After seed 20 is laid flat to seed disk assembly 11 it may be necessary in some cases to pre-orient the seed before it is observed by seed sensor 7. In some cases, pre-orienting seed 20 with protruding plate(s) 4 may speed up the orienting process allowing for faster seeding rates. With the rotation of seed disk assembly 11, the seed passes by protruding plate(s) 4 and somewhat aligns seed 20 with sensor 7. Rotating disk(s) whose axle rotates in a somewhat parallel manner to that of seed disk assembly 11 axle, may be an alternative to protruding plate 4 to perform like purpose in aligning to seed sensor 7. This offers a near equal relative velocity of the rotating disk contact point with seed 20. If the seed's geometric profile is repeatable, unique, and lends itself to repeatable mechanical orienting, protruding plate 4 or alternative rotating profile disk may be used to fully orient the seed without the need for observation by a seed sensor and eliminating the need/use of additional seed rotating mechanisms. Next, seed 20 is observed by seed sensor 7 to determine the directional orientation. Sensor 7 inspection may be triggered by using feedback from encoder 10 or similar position detecting device. The seed's corresponding unique address on seed disk assembly 11 is also tracked by feedback from encoder 10. Orientation data from sensor 7 and corresponding unique seed disk location 15 is read by a controller. A controller uses this data which then calculates the needed seed rotate angle that is later used by the rotate device to rotate seed 20 to the desired orientation. The seed sensor, controller, actuators, or other peripherals may communicate wirelessly using an emitter and receiver to simplify communication hardware. Zone 48 is marked to show the zone between the seed orientation sensor and the transition point 47 (see FIG. 8). The seed is oriented within zone 48 prior to handoff transition point 47.

There are two methods for rotating seed 20 to its desired orientation. One of which uses a rotate mechanism nest that is mounted within seed disk assembly 11. In the second method the rotate mechanism is mounted external to seed disk assembly 11.

Figure 3:
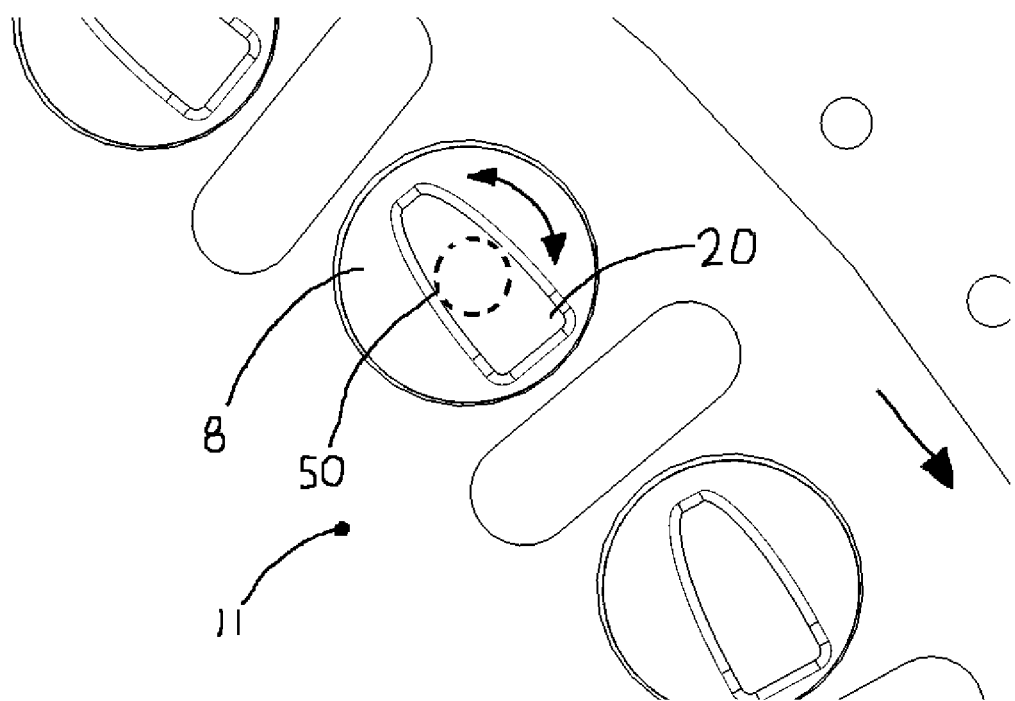
FIG. 3 is a side view of the seed nest within the seed singulation assembly.

FIG. 3 shows a closeup view of the rotate nest 8 that is mounted within seed disk assembly 11. Seed disk assembly 11, in this case, is comprised of at least one rotatable seed nest 8 assemblies. As can be seen, seed 20 is held to the nest using vacuum through hole 50. Nest 8 rotates axially to adjust the seed to the desired orientation.

Figure 4:
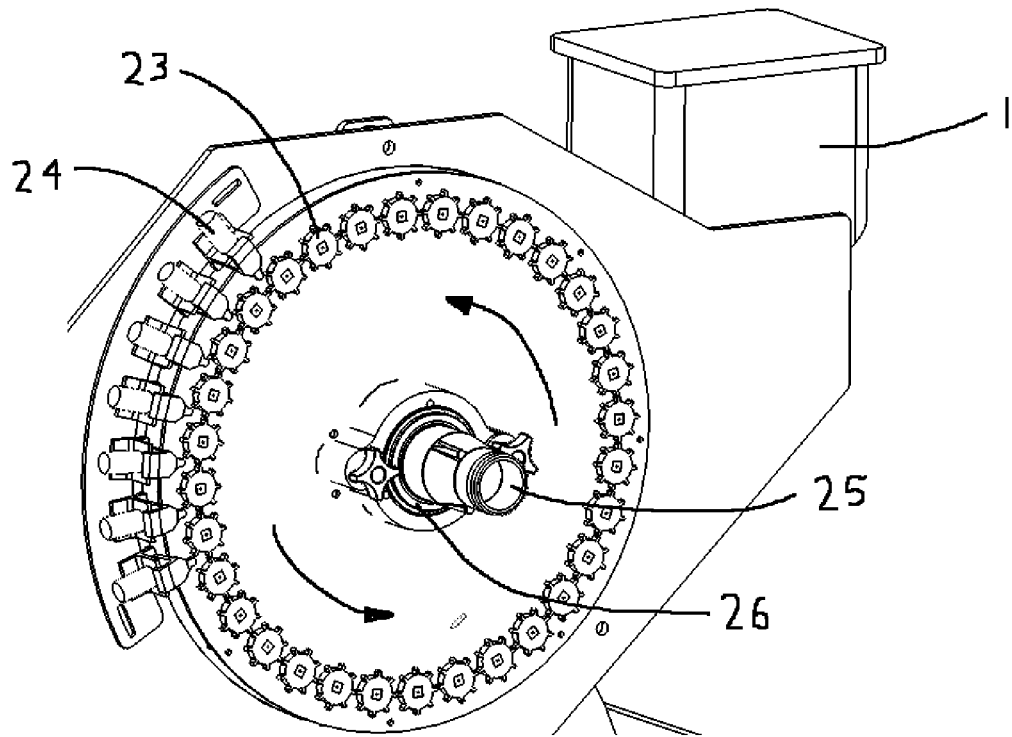
FIG. 4 is an isometric view of the progressive seed nest rotation mechanism.
Figure 5:
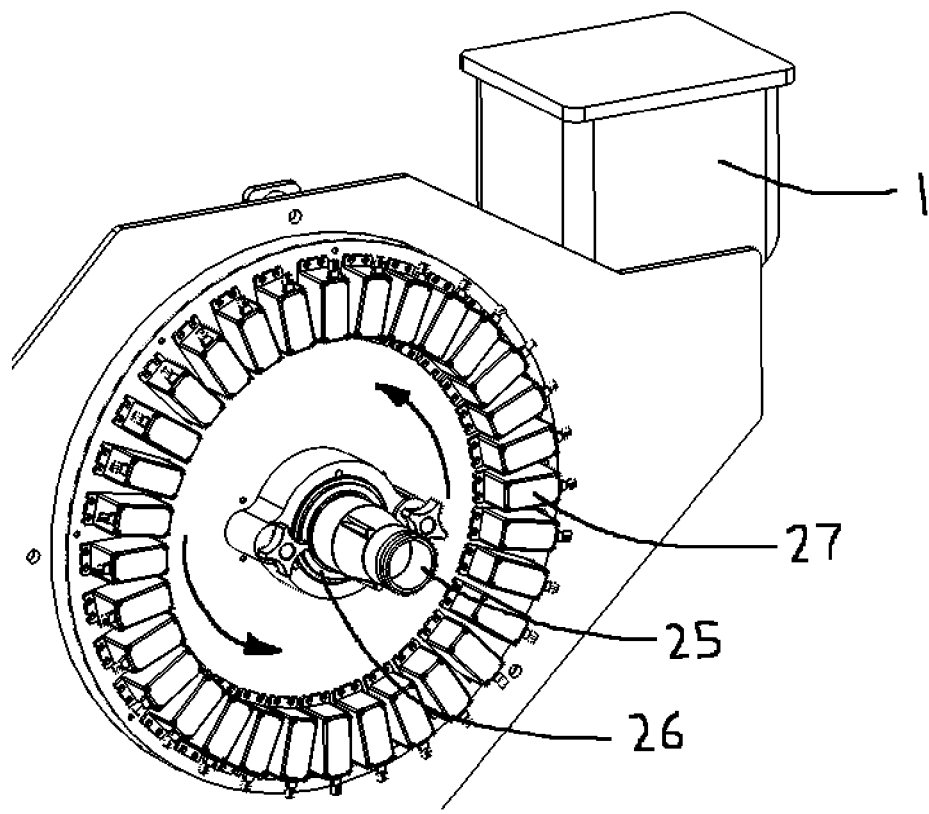
FIG. 5 is an isometric view of the rotating actuator nest mechanism.

FIG. 4 and FIG. 5 show the back side of seed disk assembly 11 where two methods of rotating the nest 8 can be seen along with a view of a vacuum plenum construction. Vacuum is created by evacuating air out of the seed disk assembly 11. This is accomplished through air evacuation at the disk's center. Vacuum hose connection point 25 allows for a vacuum hose to be connected to the seed disk assembly. This connection point 25 does not rotate but instead is fixed to a hose. Rotating seal 26 allows for the hose to be connected without the hose twisting as a seed disk assembly 20 rotates.

FIG. 4 shows the rotation of the seed nest 8 by progressive actuation of the fingers 24 located above each of the rotating nest wheels 23. Actuation fingers 24 may be controlled by means of a solenoid or other actuator not attached to seed disk assembly 11. As an example, if the seed needs to rotate 90 degrees to get to its desired orientation, nest 8 would need to rotate two notches of the finger wheel 23; therefore, using two successive actuated actuators engaging with one finger at a time as seed disk assembly 11 rotates. Alternatively, rotate finger wheel 23 could have more or less number of fingers; or have characteristics of a smooth wheel where actuator engages the wheel with a pad.

FIG. 5 shows a like method for evacuating vacuum (as in FIG. 4); however, an alternative method uses rotary actuator 27 affixed to seed disk assembly 11 to rotate nest 8. Rotatory actuator 27 will rotate nest 8 to a position based on the commanded position from the controller.

Figure 6:
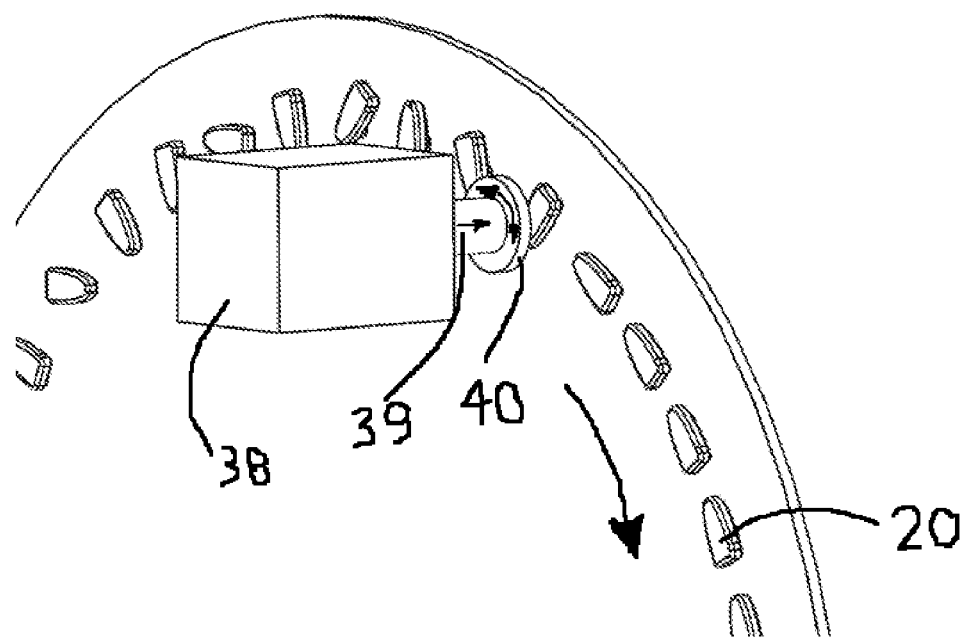
FIG. 6 is an isometric view of the externally fixed rotator actuator nest mechanism.

There are two methods of an externally mounted rotate mechanism. FIG. 6 shows an off mounted fixed actuator 38. It works by extending the actuator shaft 39 forward until head 40 comes in contact with seed 20. Upon contact, seed 20 is rotated to the desired angle of orientation based on the commanded position from the controller. Actuator shaft 39 is then retracted and the next seed is advanced by the rotation of seed disk 11, and the action is repeated.

Figure 7:
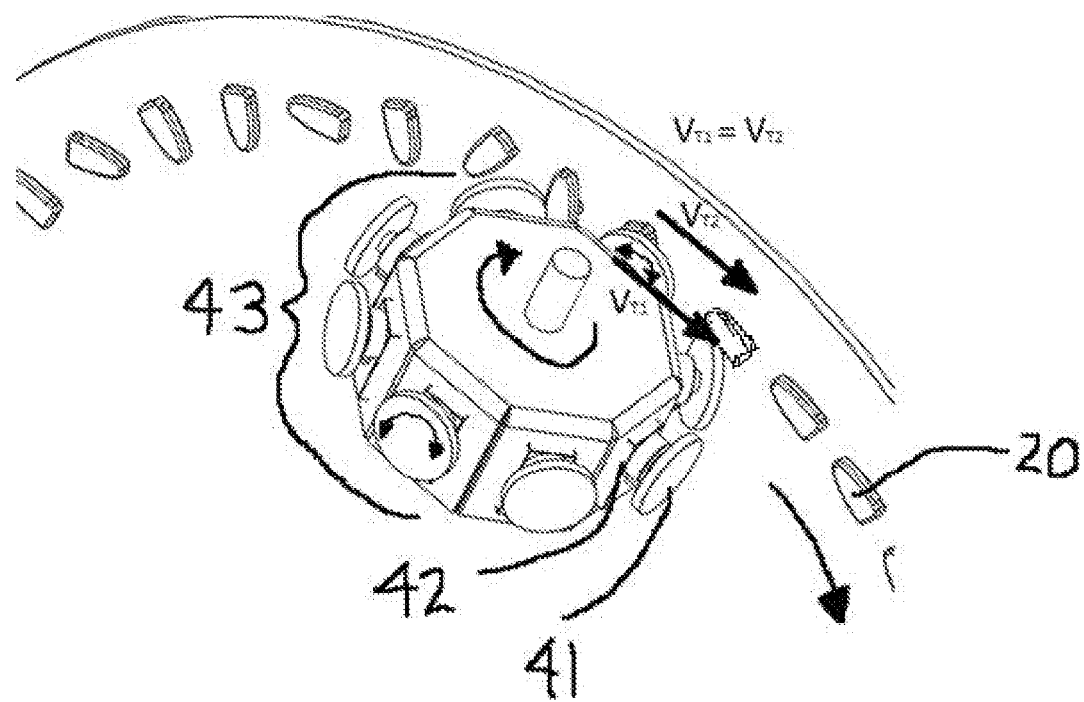
FIG. 7 is an isometric view of the externally mounted near zero relative velocity rotate mechanism.

FIG. 7 shows the second method of an externally mounted rotate mechanism 43. Mechanism 43 uses at least one actuator 42 mounted on a mechanism that has a repeating sequential continuous motion with at least one axle. The rotation of seed disk 11 and mechanism 43 would be timed together to have near zero relative velocity as each of their tangential velocities $V_{T1}$ and $V_{T2}$ are close to equal. Mechanism 43 may be driven by seed disk assembly 11 or by a separate motor and geared electrically. As the seed disk progresses through its rotation, rotate head 41 comes in contact with seed 8 and then can be rotated by actuator 42. Each rotator 42 would be commanded a rotate angle by the controller based on a previously observed orientation by the seed orientation sensor 7. Rotate head 41 may require compliance to address different thickness seeds 20 and angular engagement with seed 20.

Figure 8:
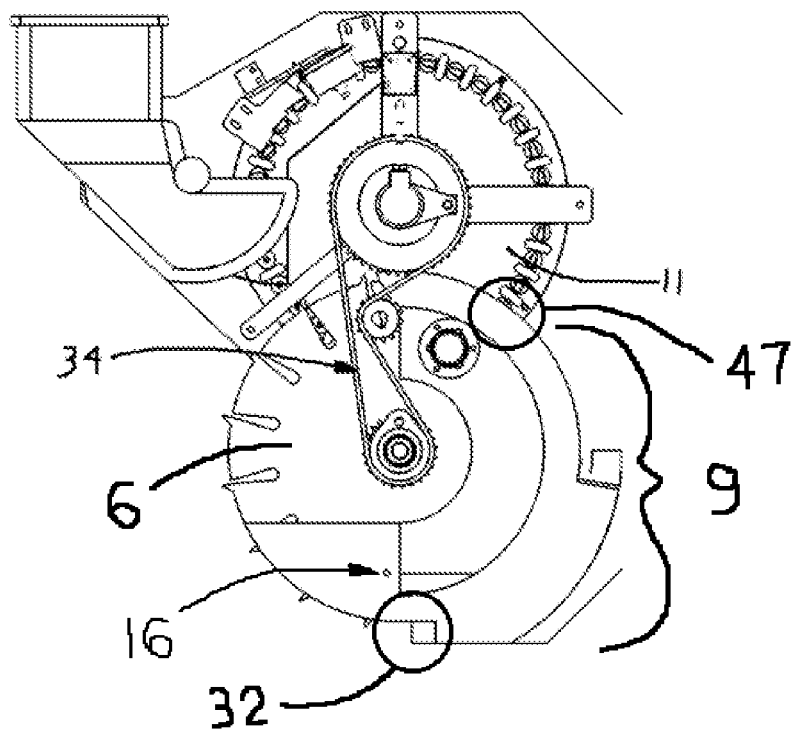
FIG. 8 is a side view that shows the transition points onto and from the transport mechanism.

The seed's transition onto transport device 9 is shown in FIG. 8. Transport device 9 is a repeating sequential continuous mechanism which may take the form of a belt, disk, or other like device. Drive mechanism 34 which links seed disk assembly 11 to transport device 9, phases the two mechanisms together to allow for a clean seed handoff. Drive mechanism 34 may be a belt or chain; however, the mechanism may contain two motors, one motor on seed disk assembly 11 and one on transport device 34 that are electronically geared.

Figure 9:
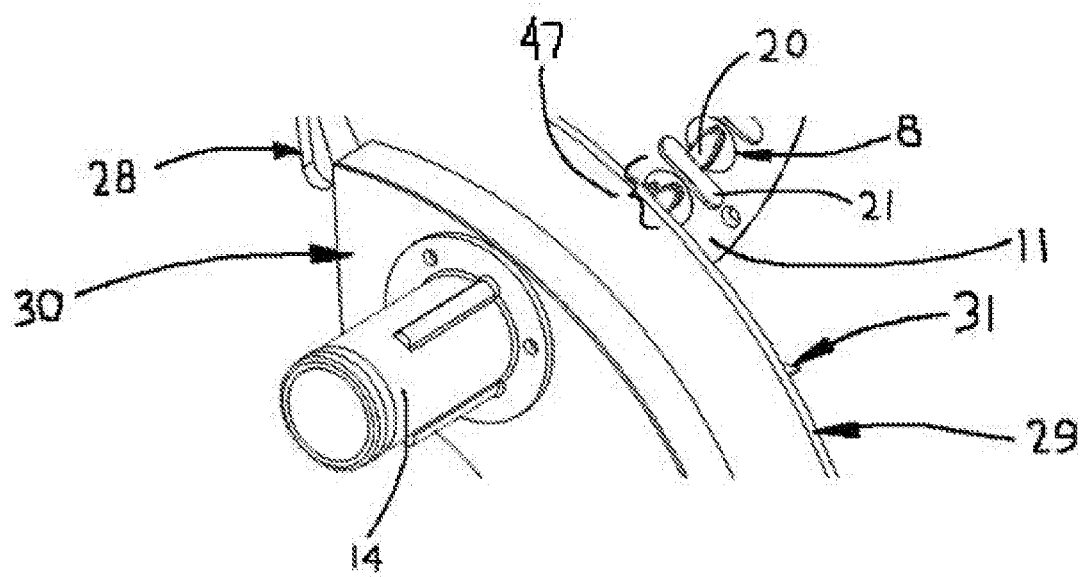
FIG. 9 is an isometric view of the vacuum method of the transport mechanism.

FIG. 9 shows seed 20 hand off point 47. There are several methods of maintaining the seed's orientation while transferring from seed disk assembly 11 to the soil with transport device 9. Two example methods are a vacuum disk and a pinch finger. FIG. 8 and FIG. 9 shows the vacuum method of transferring the seed to the soil. As seed disk assembly 11 rotates to handoff location 47 it is met with the stripping tab 31 of vacuum disk 6. Vacuum in this case is sucking radially toward the axis of vacuum disk 6 through vacuum connection 14 and plenum 30 and holds seed 20 to the outside of the disk. FIG. 9 also shows indentation 21 which is located between seed nests 8 on seed disk assembly 11. Side guide(s) 29 may be added for supporting the seed as seed vacuum disk rotates. The seed progresses around with the rotation of disk 6. Thinner seeds, due to their geometry, may use a side air vacuum port to engage and hold the seed instead of radially at the base. This would allow for the seeds to be held at their widest point. It is worth noting that as an alternative a transport belt may be used in place of the transport disk 6. Vacuum holes in this case would be added in the belt along with supporting features to hold the seed.

Figure 10:
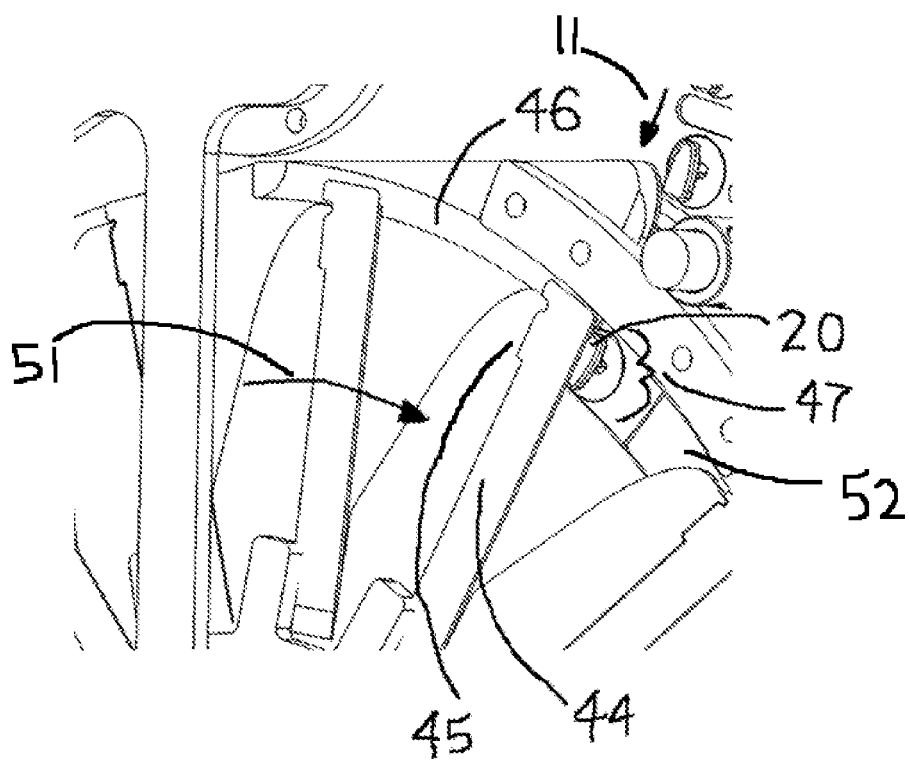
FIG. 10 is an isometric view of the finger method of the transport mechanism.
Figure 11:
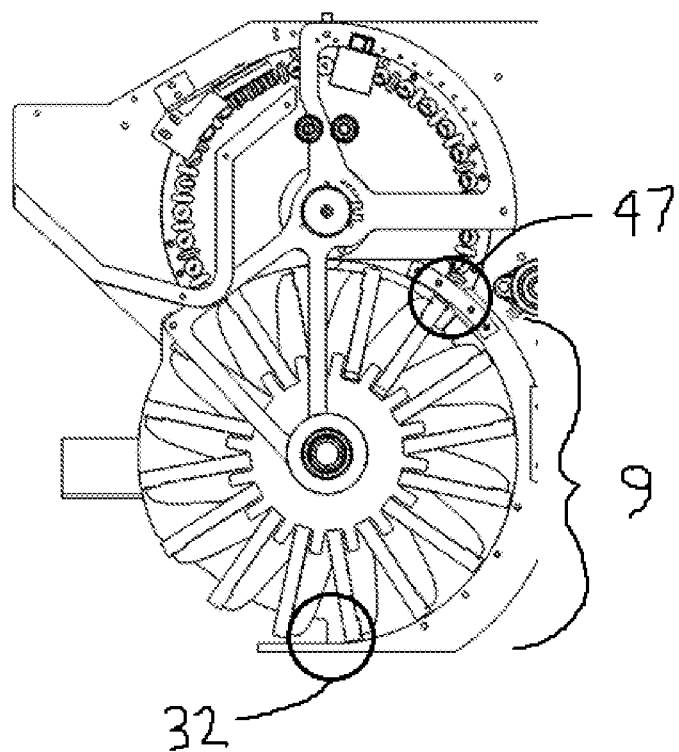
FIG. 11 is a side view of the finger method of the transport mechanism.

The alternative pinch finger transfer device can be seen in FIG. 10. Here it shows finger 44 traveling over top of seed 20 as pinch finger device 51 rotates. As finger 44 travels off lifter rail 46, finger 44 pinches seed 20. Alternative to lifter rail 46, the fingers may be lifted by a cam and rail mechanism. Seed backrest 45 traps seed 20 and ensures forward motion of the seed off seed disk assembly 11. As pinch finger device 51 rotates further, finger 44 continues to hold seed 20 against surface 52. Surface 52 continues to exit location 32 shown in FIG. 11. Alternatively, similar pinch finger features could be attached to a belt and in the same way pinch the seed against a surface that extends to the exit location.

Figure 12:
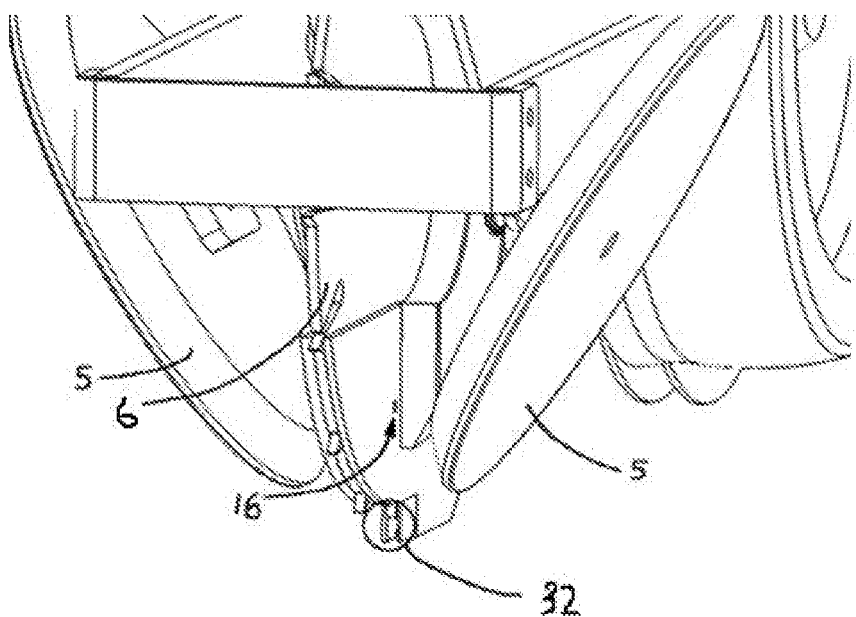
FIG. 12 is an isometric view showing the seed exit location and packing mechanism for the vacuum method of the transport mechanism.

Shown in FIG. 12, wheel(s) 5 push soil against the exit location 32, immediately packing seed 20 in the soil as it exits; therefore, maintaining its orientation. As an alternative to wheel 5, blades at a wedge angle to forward motion may also be used to displace soil against exiting seed 20. Soil is packed around seed 20 before the vacuum holding seed 20 is released; therefore, maintaining its orientation. In the event that soil gets into the seed vacuum disk 6, hole 16 allows for pressurized air to be attached to clean out the vacuum disk 6 air passage holes 28. This works by pressurizing air in this location 16 forcing the flow of air into the seed delivery disk port cleaning out debris.

Figure 13:
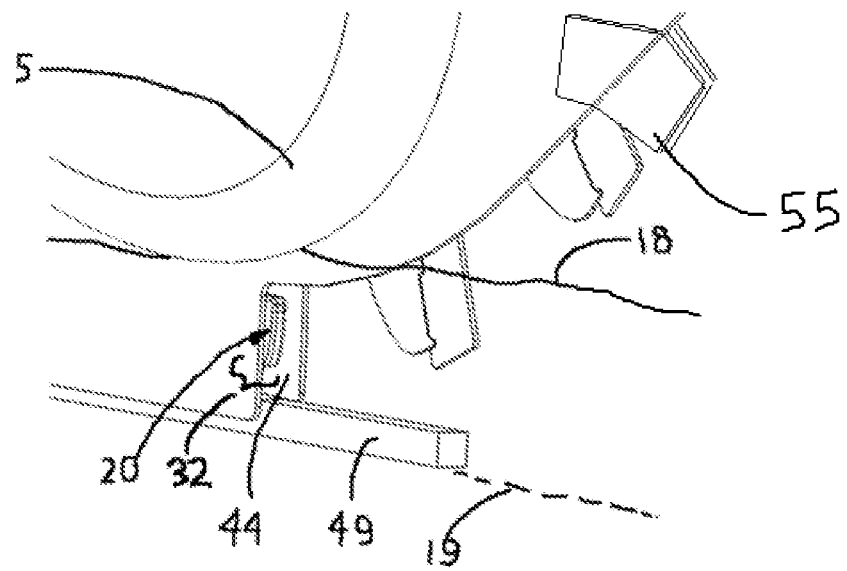
FIG. 13 is an isometric view showing the seed exit location and packing mechanism for the finger method of the transport mechanism.

FIG. 13 in the same way as that of FIG. 12, closing wheel(s) 5 or blades push soil against exit location 32, immediately packing seed 20 in the soil below ground level 18; therefore, maintaining its orientation. To clean dirt from pinch finger device 51, scraper(s) or brush(es) 55 may be added to clean dirt, mud, or other debris that may stick to the finger 44 or backrest 45.

Figure 14:
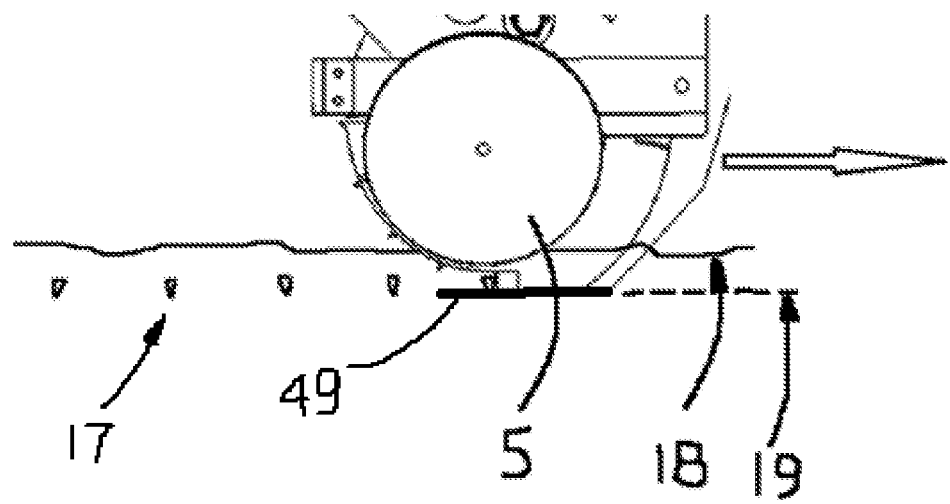
FIG. 14 is a side view showing an overall result of the invention.

As a final result FIG. 14 shows a seed planting pattern. As wheel(s) 5 push dirt around the seed from soil ground surface 18, the seeds maintain their orientation 17 (in this case seed pointed downward) near the base of the seed trench 19. Also shown is deflector 49 which travels near the bottom of the seed trench 19. Deflector 49 may be needed to prevent debris from hitting the seed premature to burial or to prevent damage to the transport device.

Figure 15:
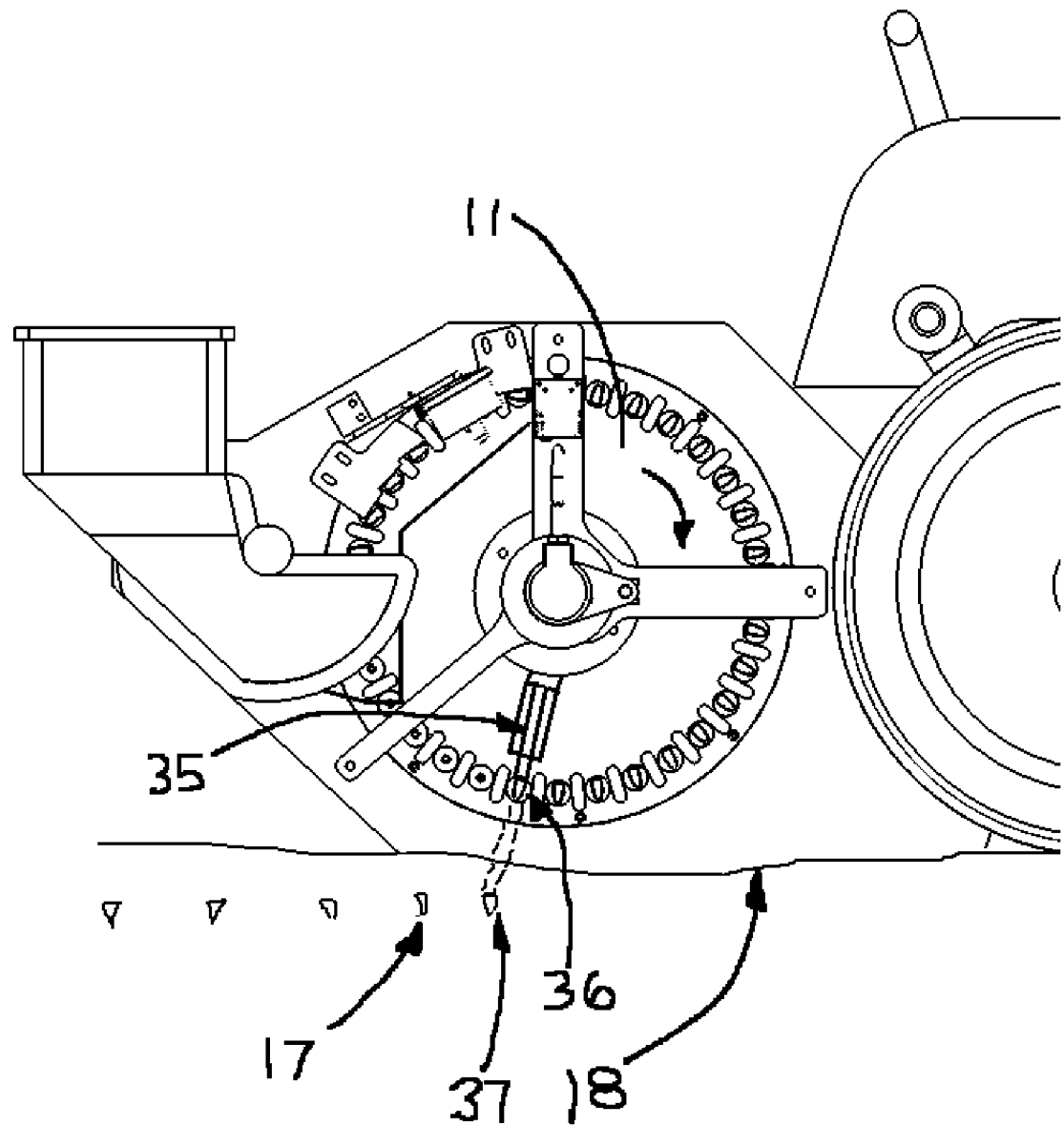
FIG. 15 is a side view of the direct planting method.

FIG. 15 shows an alternative to previous transport device where the seeds are directly transferred off seed disk assembly 11, using actuator 35 and inserted into the soil. Actuator 35 starts in position location 36 and as seed disk assembly 11 rotates, the seed is presented in front of actuator 35. Actuator 35 then transfers the seed to position 37 at a set distance below soil surface 18. The actuator then retracts to its original position 36 and the process can repeat. A vacuum interface or a mechanical pinch finger may be added to the front of the actuator to assist in holding seed orientation while it is inserted into the soil.

The invention claimed is:

1. A metering and planting mechanism for the singulation, orientation, and transportation of seed to the soil comprising:
    a singulation device wherein the transporting device is a repeating sequential continuous mechanism with at least one axis and at least one seed holding interface; and
    at least one rotatable seed holding interface nest integral to the singulation device for directionally orienting seed; and
    a transporting device which is a repeating sequential continuous mechanism with at least one axis and at least one seed holding interface, which maintains the seed orientation during transport from the seed singulation device to the soil.

2. The metering and planting mechanism as defined in claim 1, where the singulation device further comprises:
    a sensor for detecting the seed's orientation.

3. The metering and planting mechanism as defined in claim 2, where the rotatable seed holding interface nest further comprises:
    a controlled motion actuator.

4. The metering and planting mechanism as defined in claim 1, further comprising:
    a soil displacing mechanism which transfers soil against the seed as the seed exits from the transporting device prior to the complete release of the seed from the transporting device holding interface to maintain seed orientation.

5. The metering and planting mechanism as defined in claim 1, where the singulation device further comprises:
    a positional encoder feedback device, about at least one axis of the singulation device.

6. The metering and planting mechanism as defined in claim 1, where the transporting device interface further comprises:
    at least one pinch finger, integral to the moving transporting mechanism, which pinches the seed against a fixed surface.

7. The metering and planting mechanism as defined in claim 1, where the rotatable seed holding interface nest further comprises:
    a controlled motion actuator.

8. The metering and planting mechanism as defined in claim 1, further comprising:
    at least one protruding contact surface in the seed's path of the singulation device, for pre-orienting the seed prior to orienting the seed by the at least one rotatable seed holding interface.

9. The metering and planting mechanism as defined in claim 8, where the protruding contact surface further comprises:
    a moving contact surface with at least one axis, that has a relative velocity of near zero to the seed's path traveling on the singulation device, where the moving contact surface lays the seed flat against the singulation device prior to orienting based on the seed's physical geometric properties.

10. The metering and planting mechanism as defined in claim 8, where the singulation device further comprises:
    a sensor for detecting the seed's orientation.

11. The metering and planting mechanism as defined in claim 10, where the protruding contact surface further comprises:
    a moving contact surface with at least one axis, that has a relative velocity of near zero to the seed's path traveling on the singulation device, where the moving contact surface lays the seed flat against the singulation device prior to detection by the sensor.

12. The metering and planting mechanism as defined in claim 11, where the rotatable seed holding interface nest further comprises:
    a controlled motion actuator.

13. The metering and planting mechanism as defined in claim 10, where the rotatable seed holding interface nest further comprises:
    a controlled motion actuator.

14. A mechanism for the transportation of seed to the soil from a seed meter comprising:

a singulation device which is a repeating sequential continuous mechanism with at least one axis and at least one seed holding interface;

at least one device for directionally orienting seed on the singulation device; and a transporting device which is a repeating sequential continuous mechanism with at least one axis and at least one seed holding interface, wherein the transporting device maintains the seed orientation during transport from the seed singulation device to the soil; and at least one pinch finger, integral to the transporting device, which pinches the seed against a fixed surface; and a soil displacing mechanism which transfers soil against the seed as the seed exits from the transporting device prior to the complete release of the seed from the transporting device holding interface to maintain seed orientation.

\* \* \* \* \*